United States Patent
Blow, Jr.

[11] 3,913,944
[45] Oct. 21, 1975

[54] SUPPLEMENTAL PEDALLING MECHANISM FOR BICYCLES

[76] Inventor: James H. Blow, Jr., 23 Palisade Ave., Piscataway, N.J. 08854

[22] Filed: June 18, 1974

[21] Appl. No.: 480,372

[52] U.S. Cl. ............ 280/231; 280/7.16; 74/665 A; 74/722
[51] Int. Cl.² .......................................... B62K 13/00
[58] Field of Search .......... 74/216.5, 665 A, 665 B, 74/665 C, 665 D, 665 E, 594.2, 594.7, 722; 280/231, 232, 233, 282, 239, 273, 204, 7.16

[56] References Cited
UNITED STATES PATENTS

| | | | |
|---|---|---|---|
| 372,031 | 10/1887 | Casse | 280/231 |
| 602,162 | 4/1898 | Kellogg | 280/231 |
| 2,723,132 | 11/1955 | Oberwegner | 280/231 |

FOREIGN PATENTS OR APPLICATIONS

| | | | |
|---|---|---|---|
| 6,650 | 3/1898 | United Kingdom | 280/231 |
| 52,401 | 12/1889 | Germany | 280/231 |

*Primary Examiner*—Samuel Scott
*Assistant Examiner*—Allan R. Burke
*Attorney, Agent, or Firm*—Jesse Woldman

[57] ABSTRACT

A supplemental pedalling mechanism for bicycles comprises, in one embodiment, a connecting rod joining the outer end of the main crank arm to the outer end of a supplemental crank arm rotatably coupled to a support selectively positionable on the bicycle frame generally intermediate the main crank arm and the driving wheel axis.

First and second sprockets each fixedly coupled to a respective outer end of the main and supplemental crank arms for corresponding movement therewith are joined by a chain encompassing both sprockets to provide rotational correspondence between the main and supplemental crank arms.

13 Claims, 12 Drawing Figures

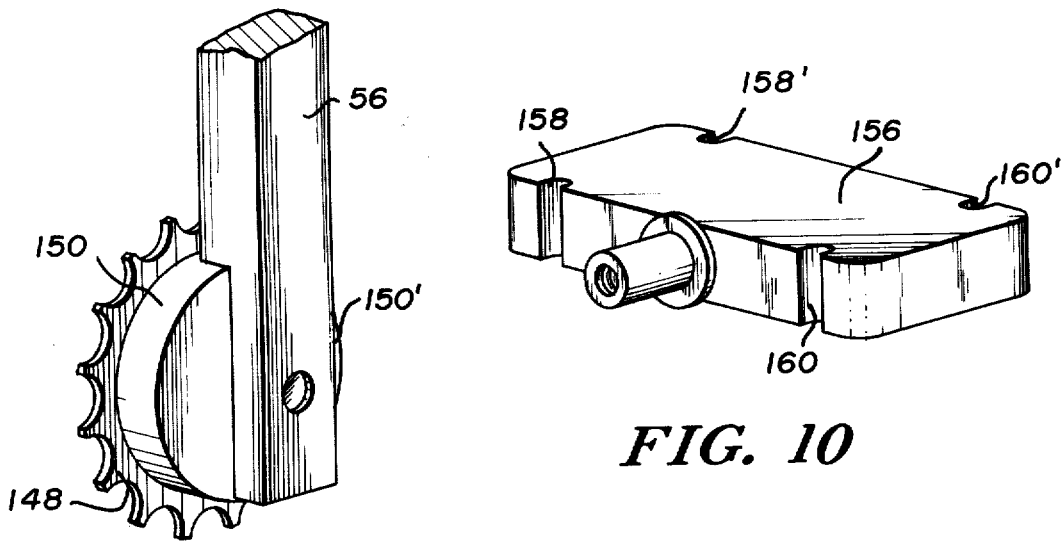
FIG. 9
FIG. 10
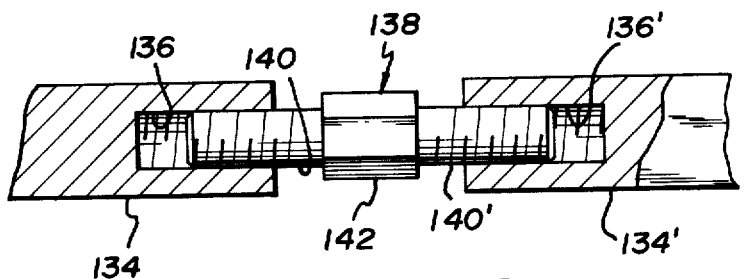
FIG. 11
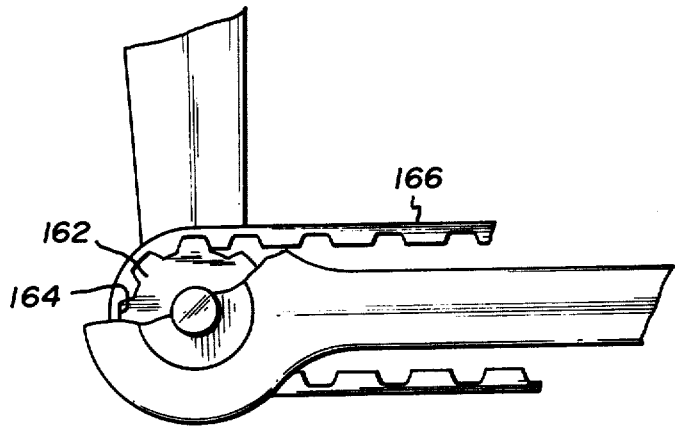
FIG. 12

3,913,944

SUPPLEMENTAL PEDALLING MECHANISM FOR BICYCLES

BACKGROUND OF THE INVENTION

1. Field of the Invention

The invention is directed to the field of auxiliary operating mechanisms for vehicles and specifically to a tandem pedalling arrangment for bicycles or the like.

2. Description of the Prior Art

Due to the cost, inconvenience and bulkiness of conventional tandem-type bicycles, there have been developed various prior art devices for converting a conventional single passenger bicycle to tandem pedalling operation, to advantageously employ the energy of a second passenger to assist in propelling the bicycle. Such devices are exemplified in: U.S. Pat. No. 2,277,727 issued to D. A. Swanson on Mar. 31, 1942; U.S. Pat. No. 2,385,892 issued to D.A. Swanson on Oct. 2, 1945; and U.S. Pat. No. 2,723,132 issued to A. R. Oberwegner on Nov. 8, 1955. The first two of the above mentioned patents disclose arrangments which require an extensive modification of the rear wheel hub portion of the bicycle which generally precludes its use a simple attachment to a conventional bicycle. The latter patent discloses a relatively complex mechanism in which the auxiliary operating pedal describes a generally elliptical path of movement which may be both extremely awkward and uncomfortable for an operator unfamilar with such motion.

SUMMARY OF THE INVENTION

The invention overcomes the limitations and difficulties noted above with respect to prior art devices by providing a simple and inexpensive supplemental pedalling mechanism which may be rapidly and conveniently attached to and removed from a conventinal single passenger bicycle. A supplemental pedal is rotatably affixed to the outer end of a supplemental crank arm, the other end of which is rotatable about a shaft extending outwardly from a crank arm support which is affixed to the frame of the bicycle generally intermediate the main crank arm and the driving wheel hub by clamp means arranged to permit selective positioning of the supplemental crank arm. The outer end of the supplemental crank arm is joined to the outer end of the main crank arm by a connecting rod preferably divided into two sections adjustably coupled together by a threaded interconnecting member to selectively vary the length of the connecting rod. Gear means which may comprise a sprocket or similar toothed member is fixedly coupled to the outer end of each of the main and supplemental crank arms generally adjacent a corresponding connecting rod end for corresponding movement with an associated crank arm. The toothed members are joined by a belt or chain extending thereabout to provide corresponding orientation of the main and supplemental crank arms during rotation whereby the supplemental crank arm is caused to describe a path of rotational symmetrical with that of the main crank arm. In accordance with the invention, the supplemental pedalling mechanism is provided in duplicate for attachment to each of the main crank arms of the bicycle. The bicycle may thus be powered from either the main or supplemental crank arms, or from both, as desired. The sole alteration of a conventional bicycle required to employ the invention is the removal of the main pedal adaptor stud from the outer end of each of the main crank arms and the attachment thereto of a stud arranged to receive the main pedal spindle, and to which is attached one end of the connecting rod and a corresponding gear means. It is therefore an object of this invention to provide a supplemental pedalling mechanism for vehicles such as a bicycle or the like.

It is another object of this invention to provide a means for converting a single passenger bicycle to tandem pedalling operation.

It is a further object of this invention to provide a supplemental pedalling mechanism attachable to a conventional bicycle by which a second rider may contribute to the power required to operate the driving wheel.

It is yet another object of this invention to provide a supplemental pedalling mechanism readily attachable to and removable from a conventional single passenger bicycle.

It is still a further object of this invention to provide, in a conventional bicycle, a supplemental pedalling mechanism connected to the main crank arm to transmit the power exerted by a second rider to the main crank arm to assist the first rider in operating the driving wheel.

It is yet a further object of this invention to provide, in a conventional bicycle, a supplemental pedaling mechanism having a supplemental crank arm connected to the main crank arm so as to provide symmetry of rotation between the supplemental crank arm and the main crank arm.

Other objects and features of the invention will be pointed out in the following description and claims, and illustrated in the accompanying drawings which disclose, by way of example, the principles of the invention, and the best modes contemplated for carrying it out.

BRIEF DESCRIPTION OF THE DRAWINGS

In the Drawings

FIG. 9 is a fragmentary perspective view, partly in section, of a further embodiment of a gear means of a supplemental pedalling mechanism constructed in accordance with the cncepts of the invention.

FIG. 10 is a perspective view of a further embodiment of a crank arm support of a supplemental pedalling mechanism constructed in accordance with the concepts of the invention.

FIG. 11 is an enlarged fragmentary sectional view of a further embodiment of a connecting rod adjusting means for a supplemental pedalling mechanism constructed in accordance with the concepts of the invention.

FIG. 12 is a fragmentary side elevational view, partly cut away, of a further embodiment of a portion of the assembly of a supplemental pedalling mechanism constructed in accordance with the concepts of the invention.

Similar elements are given similar reference characters in each of the respective drawings.

DESCRIPTION OF THE PREFERRED EMBODIMENTS

Figure 1:
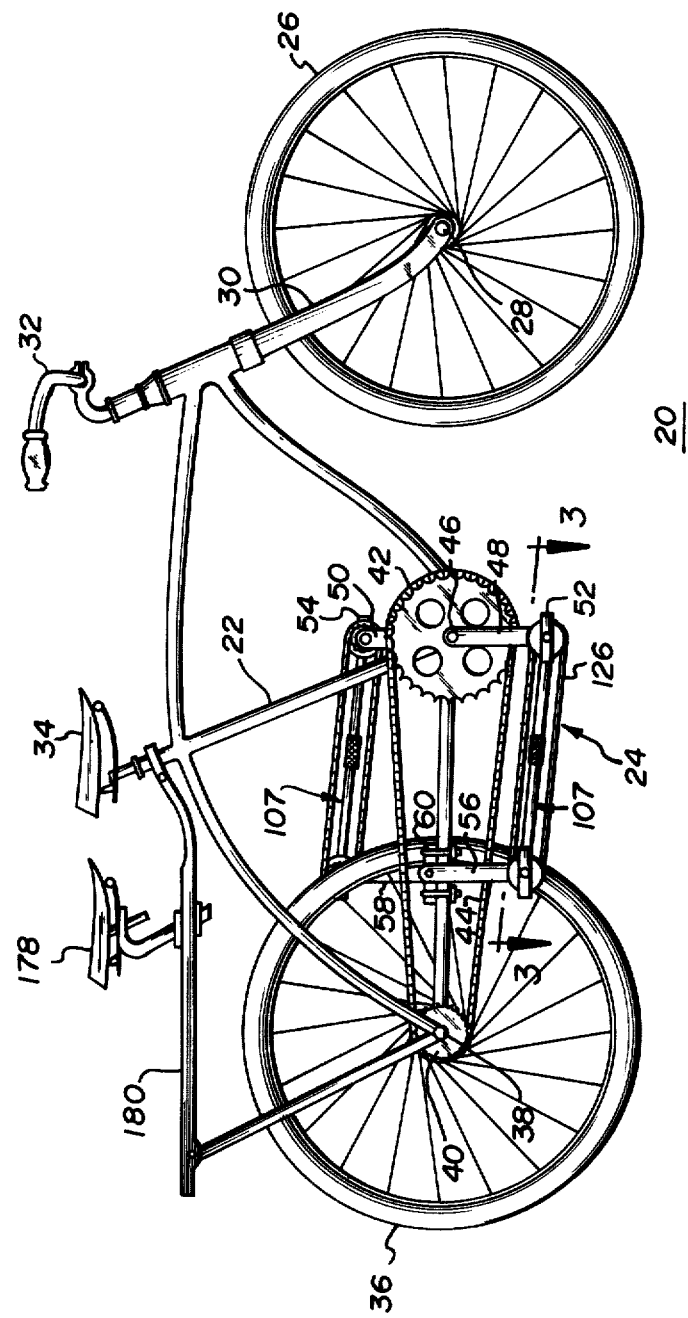
FIG. 1 is a side elevational view, showing a single passenger bicycle having attached thereto a supplemental pedalling mechanism constructed in accordance with the principles of the invention.
Figure 2:
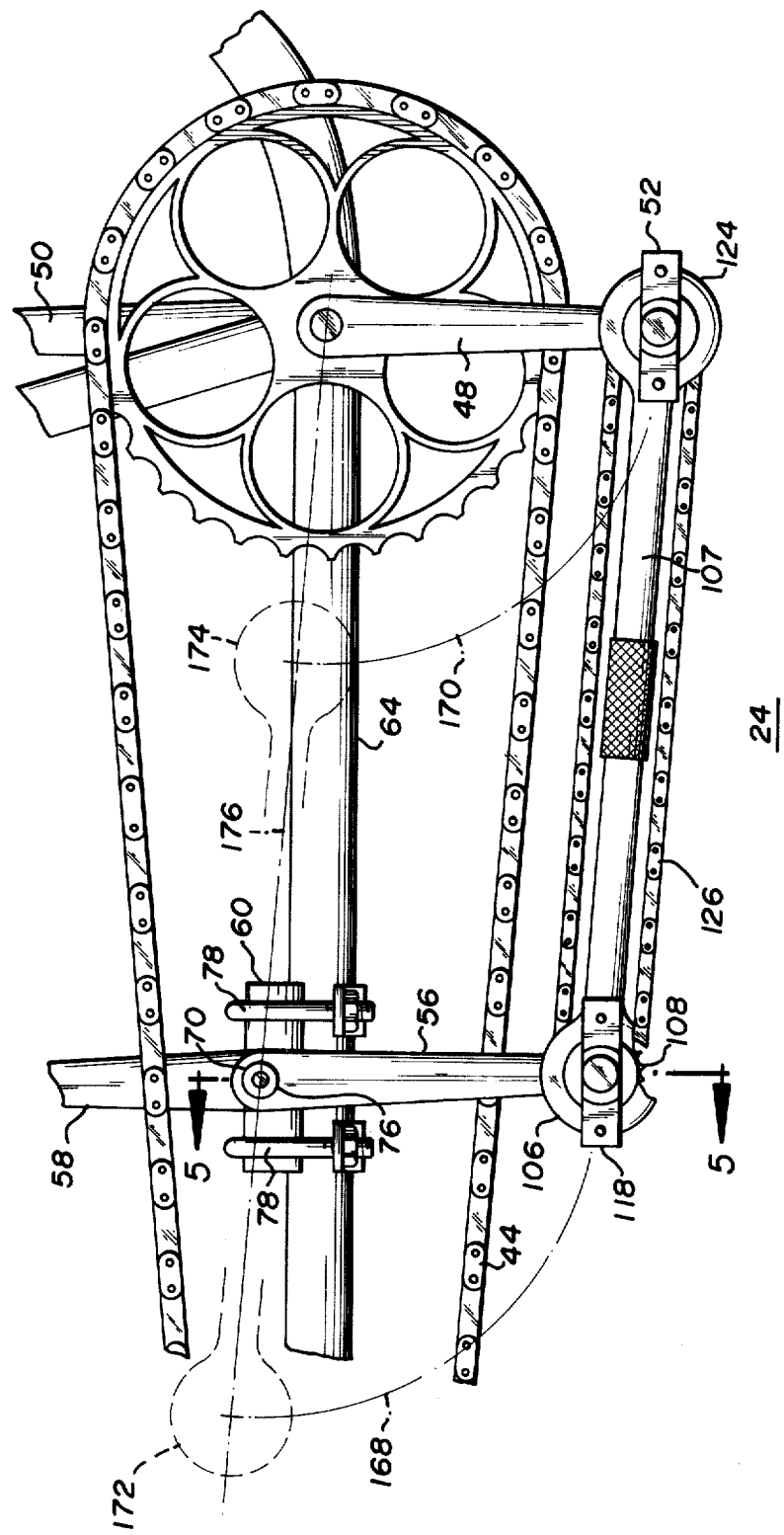
FIG. 2 is an enlarged framentary side elevational view, partly cut away, of the device of FIG. 1.
Figure 5:
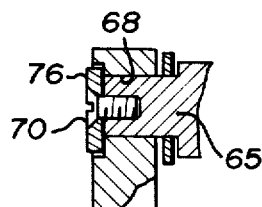
FIG. 5 is a fragmentary side elevational view, partly cut away and partly in section, taken along the line 5—5 of FIG. 2.
Figure 8:
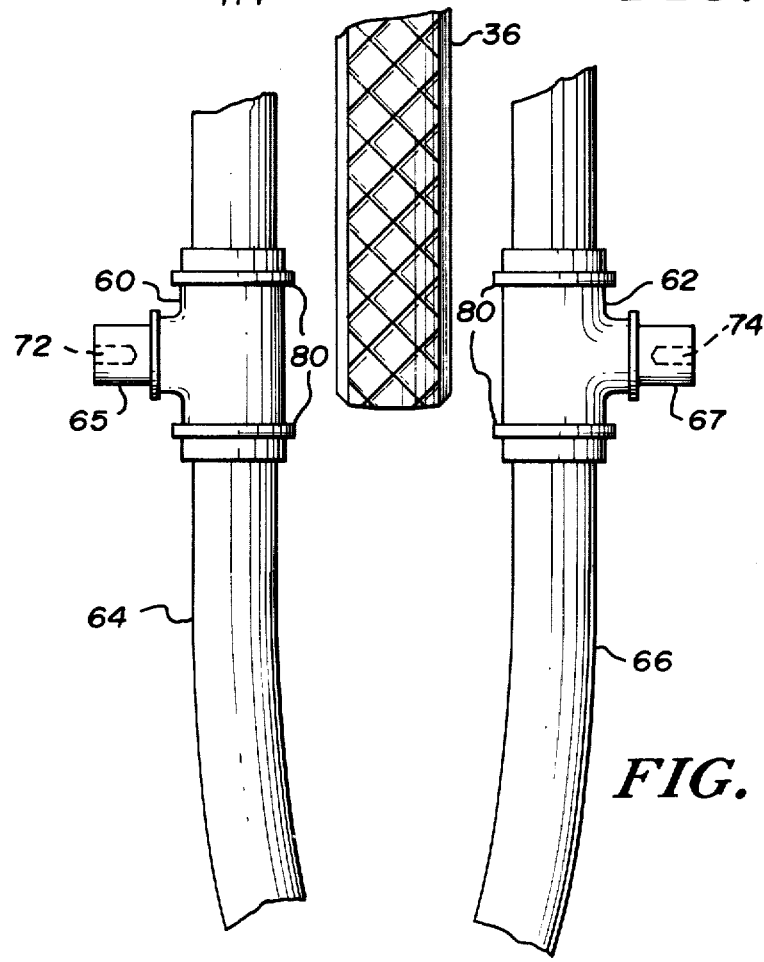
FIG. 8 is a fragmentary top plan view, showing the support and bracket assembly of the device of FIG. 1 mounted to the frame of a bicycle.

Turning now to FIGS. 1, 2, 3, 4, and 5, there is shown a bicycle 20 having a frame 22 to which is attached a supplemental pedalling mechanism 24 constructed in accordance with the concepts of the invention. The bicycle 20 is of conventional construction and further comprises a front steerable wheel 26 rotatable about a front axle 28 carried by a fork 30 connected to a handlebar 32, a seat 34, a rear driving wheel 36 rotatable about a rear axle 38 supported by the frame 22 and connected to a rear sprocket 40 operatively coupled to a main sprocket 42 by a chain 44, the main sprocket 42 being driven by a crank 46 having oppositely extending main crank arms 48 and 50 each having a pedal 52, 54, respectively, at its outer end for manually rotating the crank 46. The supplemental pedalling mechanism 24 is attached to the frame 22 and the main crank arms 48 and 50 essentially as shown in FIGS. 1 and 2. As illustrated, there is provided a pair of supplemental crank arms 56 and 58, each rotatably connected at tis first end to a respective support means such as members 60 and 62 each fastened to one of a pair of rame members 64 and 66 (FIG. 8) which straddle the rear driving wheel 36. The support members 60 and 62 each comprise a shaft portion 65 and 67, respectively, extending into a suitably bored transverse shaft receiving aperture 68 at the first end of each of the supplemental crank arms 56 and 58. Each supplemental crank arm is retained in place on a respective shaft 65, 67 by a fastening means such as a screw 70 threadably fastened into a suitably threaded aperture 72, 74 in the support shaft portions 65 and 67, respectively. A wahser 76 is interposed between the head of each screw 70 and the first end of each supplemental crank arm to provide a bearing surface therefor. The support members 60 and 62 are each fastened to a respective frame member 64 and 66 preferably by an assembly comprising a pair of U-shaped members 78 (FIG. 4) having a bight portion 80 and threaded leg portions 82, 82'. The members 78 are disposed on either side of the shaft portion 65, 67 of the support members 60, 62, respectively, with the bight portion 80 overlying the support member 60, 62 and the threaded leg portions 82, 82' extending downwardly beyond each frame member 64, 66. A bracket 84 haing spaced apertures 86, 86' corresponding to the spacing between the threaded ends 82, 82' of member 78 is disposed against the underside of each frame member 64, 66, directly opposite a corresponding member 78 so that the ends 82, 82' of a respective member 78 extends through apertures 86, 86' of a respective bracket 84. A washer 88 is disposed over each threaded end 82, 82' extending beyond a respective bracket 84, and a nut 90 threaded onto each threaded end 82, 82' to complete the assembly. Since each supplemental crank arm 56, 58 comprises a similar second end and is connected to a respective main crank arm 48, 50 in similar manner, for the sake of simplicity and convenience, one such assembly comprising supplemental crank arm 56 and main crank arm 48 is shown in detail and will be described accordingly, although it will be understood that a similar arrangment is provided on the opposite side of the bicycle 20. As best seen in FIG. 5, the supplemental crank arm 56 comprises a second or outer end 92 having a transverse threaded aperture 94 which, for the sake of convenience, is essentially duplicative of the usual threaded aperture arranged to receive the threaded end of the spindle of a conventional pedal. A stud 96 having an enlarged head portion 98, a first shank portion 100 adjacent the head portion 98, a second shank portion 102 adjacent the first shank portion 100 and of slightly smaller diameter, and a threaded end 104 corresponding to the threaded end of the spindle of a conventional pedal, is fastened to the second end 92 of the supplemental crank arm 56 by threading the threaded end 104 of stud 96 into the threaded aperture 94 of crank arm 56. Interposed between the head portion 98 of stud 96 and the second end 92 of crank arm 56 is one end 106 of a connecting rod 107 and a first gear means such as a sprocket 108. The connecting rod end 106 is rotatable about the first shank portion 100 of stud 96, there being a bearing 110 having an inner race 112 tightly fitted on the first shank portion 100 of stud 96 and an outer race 114 tightly fitted within a transverse aperture in the end 106 of connecting rod 107. The sprocket 108 is fitted on the second shank portion 102 of stud 96 so that, as the stud 96 is threaded tightly into the threaded aperture 94, the sprocket 108 will remain in a fixed position reltive to the supplemental crank arm second end 92 for corresponding movement therewith. The stud 96 further comprises a threaded aperture 116 extending axially inwardly from its head end 98 and similar to the threaded aperture 94 in crank arm 56. A supplemental pedal 118 is coupled to the stud 96 by means of a threaded spindle end 120 extending from the pedal 118 and threaded into the aperture 116 of stud 96. The outer end of the main crank arm 48 comprises an assembly essentially duplicative of that described herein above and illustrated in detail in FIG. 5, with respect to the outer end 92 of the supplemental crank arm 56. In this case, however, the main pedal 52 is removed from the outer end of the main crank arm and replaced by an element such as stud 96 wherein the threaded end 104 thereof is screwed into the threaded aperture previously occupied by the threaded spindle of the main pedal 52. A second sprocket 122 (FIG. 3) is secured to the second shank portion 102 of the second stud 96, and the second end 124 (FIG. 3) of the connecting rod 107 is rotatably coupled to the first shank portion 100 of the second stud 96, the second end 124 of connecting rod 60 including a bearing such as the bearing 110 employed at the first end 106 of connecting rod 60 and similarly disposed about the first shank portion 100 of the second stud 96. The second sprocket 122 is tightly fitted on the second shank protion 102 of the second stud 96 so that, upon tightening the threaded end 104 of the second stude 96 into the corresponding threaded aperture in the outer end of the main crank arm 48, the second sprocket 122 is caused to remain fixed in position relative to the outer end of the main crank arm 48. The main pedal 52 is attached to the outer end of the second stud 96 by screwing its threaded spindle into the threaded aperture 116 in essentially the same manner as the supplemental pedal 118 is attached to the first stud 96. Coupling means such as a sprocket chain 125 extends over both the first and second sprockets 108 and 122, respectively, to couple said sprockets to one another to insure corresponding orientation between the main and supplemental crank arms 48 and 56, respectively, as the main crank arm is rotated about an axis extending longitudinally through the crank 46.

The connecting rods 107, alone, merely insure that the distance between the second or outer end of the corresponding main and supplemental crank arms 48 and 56, and 50 and 58, respectively, remains constant while transferring the torque generated by either of the corresponding main or supplemental crank arms to the other. Furthermore, since each of the supplemental crank arms 56 and 58 is movable independently of the other, the particular direction in which each will rotate is governed essentially by the position of its corresponding main crank arm providing there is a transfer of torque from one to the other. For example, the main and supplemental crank arms 48 and 56, respectively, as shown by the solid outline in FIG. 2, are angularly offset from the axis 176 connecting their respective pivot points. In this position, rotation of either the main or supplemental crank arm 48, 56, respectively, in, for example, the clockwise direction will cause the other crank arm to move in a corresponding direction. However, when the main and supplemental crank arms 48 and 56, respectively, have attained the respective positions shown by the dotted outlines 174 and 172 in FIG. 2, that is, when they are aligned along a common axis such as 176, there is no transfer of torque between them and further rotation of the main crank arm 48, for example, in a clockwise direction will not necessarily insure that its corresponding supplemental crank arm 56 will continue to rotate in the same direction since the connecting rod 107, as explained above, will only insure that the distance between the second ends of the corresponding main and supplemental crank arms remains constant. Accordingly, without the inclusion of the sprocket chain 126 and the corresponding fixed sprockets 108 and 122, it will be clear that the rotation of the supplemental crank arm 56, for example, may be reversed at this point by the pressure exerted by the second rider thereon, while the main crank arm 48 is further rotated in a clockwise direction by the first rider, whereby the second end of the supplemental crank arm 56 will retraverse the path shown by the arc 168 while the second end of the main crank arm 48 continues along the path (not shown) extending clockwise from the upper end of the arc 170. However, such reversal of rotation and loss of orientation between the main and supplemental crank arms is effectively prevented by the presence of the combination of the sprocket chain 126 and the sprockets 108 and 122. Since each of the sprockets 108 and 122 is nonrotatably mounted to the second end of its corresponding crank arm, each tooth thereof will remain in a fixed position relative to the axis of its associated crank arm. Thus, by encircling the sprockets 108 and 122 by a common sprocket chain 126, any tendency for one of the corresponding main and supplemental crank arms to rotate in a direction opposite to that of the other will be resisted by the torque applied to its associated sprocket through the chain 126 as a consequence of the relative position of the other sprocket, thereby insuring corresponding orientation and rotation between each pair of corresponding main and supplemental crank arms.

Figure 3:
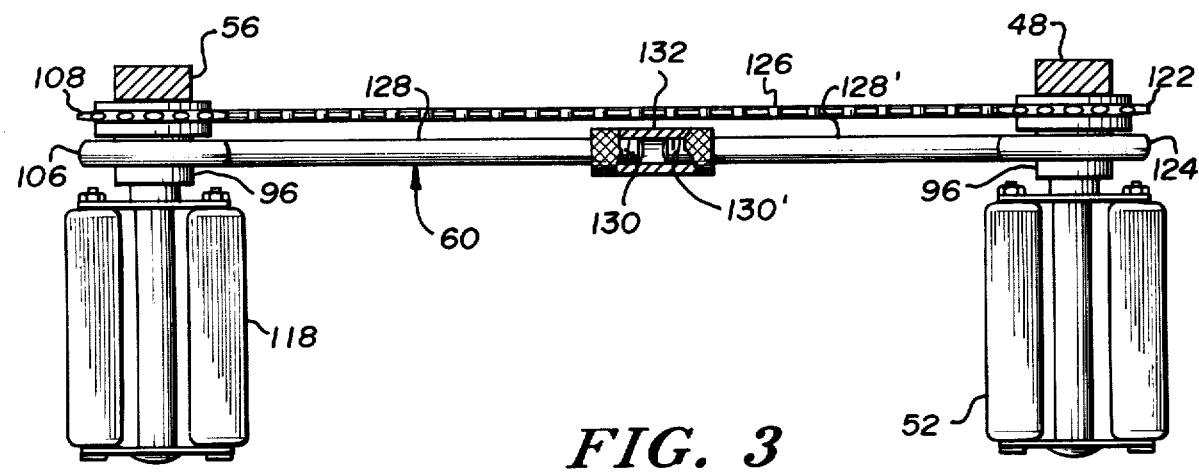
FIG. 3 is a top plan view, partly cut away and partly in section, taken along the line 3—3 of FIG. 1.
Figure 4:
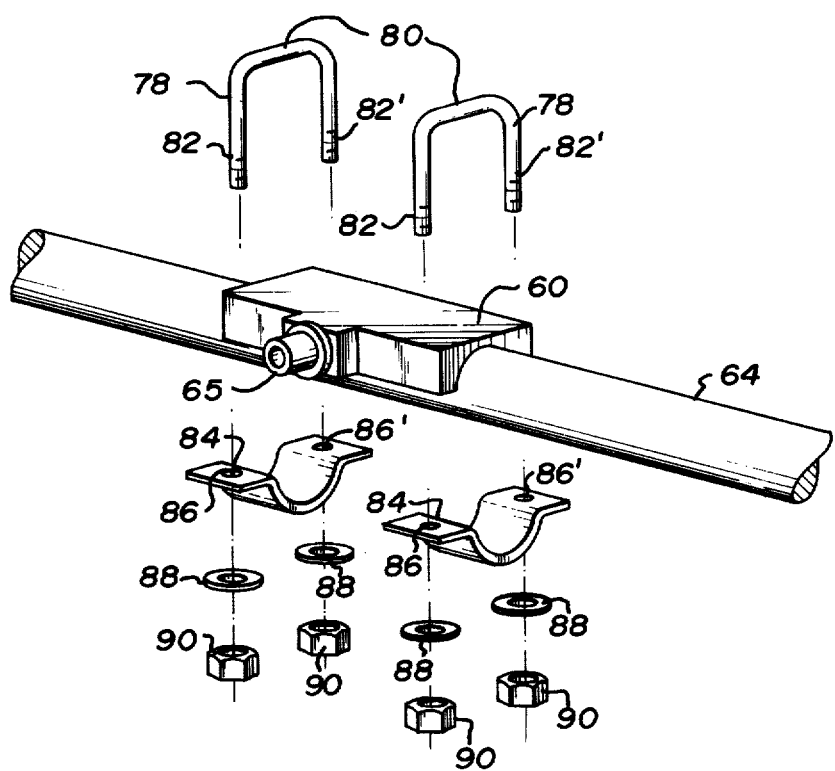
FIG. 4 is an exploded perspective view, showing the support and bracket assembly of the device of FIG. 1.

As further illustrated in FIG. 3, the connecting rod 60 may be divided into two sections 128, 128' each having an externally threaded end 130, 130', respectively, engaging an interconnecting member such as an internally threaded sleeve 132. By providing a left hand thread on one of the threaded ends 130, 130', and a right hand thread on the other of these two ends, and providing mating internal threads adjacent each end of the sleeve 132, the length of the connecting rod may be selectively varied by rotating the sleeve 132 either clockwise or counterclockwise, according to the relative positions of the left and right hand threads on the respective connecting rod ends 130 and 130'. Accordingly, to assemble the sprocket chain 126 to the sprockets 108 and 122, the sleeve 132 may be suitably rotated to draw the outer ends of the main and supplemental crank arms 48 and 56 together sufficiently to permit the chain 126 to be extended over each of the sprockets 108 and 122. After this assembly is completed, the sleeve 132 is rotated in the opposite direction to remove the slack in the chain 126 to provide a relatively tight fit between the chain 126 and the sprockets 108 and 122. An alternative arrangement for adjusting the length of the connecting rod is shown in FIG. 11. In this embodiment, connecting rod ends 134 and 134' are each selectively internally threaded as at 136, 136', respectively. An elongate member such as a spindle 138 is provided with opposed selectively threaded ends 140, 140' intermediate which is an unthreaded portion 142 selectively flatted about its periphery for convenience of rotation either manually or by the use of a suitable tool. The threaded ends 140 and 140' of spindle 132 are threadably joined to the respective internally threaded ends 134 and 134' of the connecting rod to provide an adjustable coupling therebetween. Adjustment of the length of the connecting rod may be readily accomplished by providing a right hand thread at one end of the spindle 138 and a left hand thread at the other end, each mating with a corresponding right and left hand internally threaded connecting rod end. Accordingly, rotation of the spindle 138 about its axis in one direction will cause a decrease in the overall length of the connecting rod while rotation in the other direction will cause an increase in the overall length of the connecting rod. The sprockets 108 and 122 may be additionally secured in place adjacent the respective outer ends of the crank arms 56 and 48, respectively, by an arrangement similar to that shown with respect to the crank arm 56 in FIG. 5. As illustrated, a screw 144 is threadably engaged within a threaded aperture 146 extending generally transversely through the second end 92 of crank arm 56. The aperture 146 is suitably located so as to cause the end of the screw 144 to contact the side of the sprocket 108 which may be suitably bored, recessed, or otherwise indented at either one or more postions coextensive with screw 144. Alternatively, an arrangement such as that illustrated in FIG. 9 may be employed to prevent rotation of the sprockets 108 and 122 about their respective axes. As shown, a sprocket 148 is provided with an end portion having opposingly disposed shoulders 150, 150' selectively spaced to closely overlap the adjacent edges of the corresponding crank arm which, for purposes of illustration is referenced as supplemental crank arm 56, it being clear that a similar arrangement may be provided in connection with the main crank arm 48.

Figure 6:
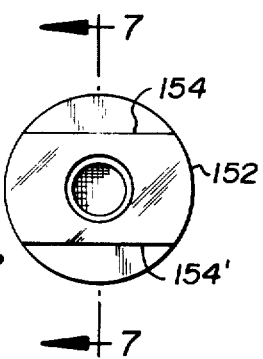
FIG. 6 is a front elevational view of a further embodiment of a replacement stud of a supplemental pedalling mechanism constructed in accordance with the concepts of the invention.
Figure 7:
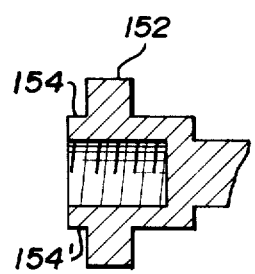
FIG. 7 is a side elevational view, in section, taken along the line 7—7 of FIG. 6.

Referring now to FIGS. 6 and 7, there is shown a further embodiment of a stud 152 similar to studs 96 but further including a pair of spaced, flatted edges 154, 154' arranged to be engaged by the jaws of a wrench or other suitable tool to tighten the studs 152 into position adjacent the respective outer ends of the crank arms 48 and 56.

Turning now to FIG. 10, there is shown a further embodiment of a support member 156 for a supplemental pedalling mechanism constructed in accordance with the concepts of the invention. The support member 156 is essentially similar to the support member 60 but further includes two pair of spaced recesses 158, 158' and 160, 160', each pair arranged to receive therethrough the leg portions 82, 82' of a respective member 78 to provide additonal engagement between the members 78 and the support member 156, where necessary or desirable. Accordingly, the support member 156 may be shifted in either direction along its respective bicycle frame portion for proper alignment prior to tightening the members 78 into locking engagement therewith, the members 78 moving in correspondence therewith throughout this adjustment procedure which will be described in more detail hereafter.

Turning now to FIG. 12, there is shown a further embodiment of a gear means of a supplemental pedalling mechanism constructed in accordance with the concepts of the invention. The gear means comprises a timing gear 162 which may be readily substituted for the sprockets 108 and 122 and comprises a series of truncated teeth 164 adapted to mate with a toothed belt 166 extending over the gears 162 which are located adjacent the outer ends of the main and supplemental crank arms 48 and 56, respectively, in a manner similar to that described above with respect to the elements 108 and 122.

Alignment of the supplemental pedalling mechanism 24 may best be understood by referring now specifically to FIG. 2. It will be understood that although the procedure is directed to the assembly on one side of the bicycle 20, the same procedure is followed to align the assembly on the opposite side of the bicycle 20. The support member 60 is loosely attached to the frame member 64 to provide for convenient repositioning during the alignment procedure. The main and supplemental crank arms 48 and 56, respectively, which are of the same length, are now swung through an arc indicated by reference characters 168 and 170, each crank arm 48 and 56 being caused to follow the other by virtue of the intercoupling provided by the connecting rod 107 and the sprocket and chain arrangement described hereinabove. The crank arms are brought to rest at a position indicated generally by the dotted outlines 172 and 174 so that a common axis indicated at 176 passes through the axis of rotation of each crank arm and through the axis of rotation of each of the pedals 52 and 118. The support member 60 is now tightened against the frame member 64, which completes the alignment procedure. This same procedure is followed on the opposite side of the bicycle. All of the parts indicated comprising the supplemental pedalling mechanism may thus be conveniently furnished in kit form and assembled rapidly and simply to a conventional single rider bicycle to permit tandem pedalling operation. For added convenience, a supplemental seat 178 (FIG. 1) may be provided and conveniently fastened to the luggage carrier 180 for the second rider, if desired. The torque applied to the supplemental crank arms 56 and 58 by the second rider is thus transmitted through the connecting rods 107 to the main crank arms 48 and 50 and added to the torque applied by the first or front rider to rotate the main sprocket 42 which is operatively coupled to the rear driving wheel through the sprocket chain 44. Both riders may thus contribute essentially equally towards propelling the bicycle along the roadway, or either alone may supply the driving force, according to the spirit of the invention and within the concepts herein disclosed.

The embodiments of the invention in which an exclusive property or privilege is claimed are defined as follows:

1. A bicycle construction comprising: a bicycle frame having at least one driving wheel; a main crank arm having a first end rotatable on said frame and a second end having a pedal rotatable thereat; drive means connecting said main crank arm to said driving wheel; a supplemental crank arm having a first end and a second end; support means selectively positionable on said fram generally intermediate said main crank arm and the axis of said driving wheel, said supplemental crank arm first end being rotatably coupled to said support means; a supplemental pedal rotatable on sais supplemental crank arm second end; a connecting rod having one end coupled to said supplemental crank arm secsond end and the other end coupled to said main crank arm second end; first gear means coupled to said supplemental crank arm second end for corresponding movement therewith; second gear means coupled to said main crank arm second end for corresponding movement therewith; and means coupling said first gear means to said second gear means to maintain corresponding orientation between said supplemental crank arm and said main crank arm as said main crank arm is rotated about its first end.

2. A supplemental pedalling means as defined in claim 1 wherein said connecting rod comprises a first section and a second section joined together by an interconnecting member selectively engageable with each of said first and said second sections to permit adjustment of the length of said connecting rod.

3. A bicycle construction as defined in claim 2 wherein said interconnecting member comprises a selectively internally threaded sleeve, and said connecting rod first and second sections each comprise an externally threaded end threadably coupled to said sleeve.

4. A bicycle construction as defined in claim 3 wherein one of said first and said second section threaded ends comprises a right hand thread and the other of said first and said second section threaded ends comprises a left hand thread, said sleeve having a corresponding right hand internally threaded portion adjacent one end thereof and a corresponding left hand internally threaded portion adjacent its other end, so that rotation of said sleeve about its longitudinal axis in one direction causes a decrease in the length of said connecting rod and rotation of said sleeve in the opposite direction causes an increase in the length of said connecting rod.

5. A bicycle construction as defined in claim 2 wherein said interconnecting member comprises an elongate member having selectively externally threaded ends, and said connecting rod first and second sections each comprise a selectively internally threaded end threadably engaged with a corresponding externally threaded end of said elongate member.

6. A bicycle construction as defined in claim 5 wherein one of said first and said second sections has a left hand threaded internally threaded end and the other of said first and said second sections has a right hand threaded internally threaded end, said elongate member having a corresponding right hand externally threaded portion adjacent one end thereof and a corresponding left hand externally threaded portion adjacent its other end so that rotation of said elongate member about its longtudinal axis in one direction causes a decrease in the length of said connecting rod and rotation of said elongate member in the opposite direction causes an increase in the length of said connecting rod.

7. A bicycle construction as defined in claim 1 wherein said support means comprises a shaft projecting outwardly therefrom, said supplemental crank arm first end being rotatable about said shaft.

8. A bicycle construction as defined in claim 1 wherein said first gear means comprises a first sprocket and said second gear means comprises a second sprocket, said means coupling said first sprocket to said second sprocket being a chain extending about said first and said second sprockets.

9. A bicycle construction as defined in claim 8 wherein each of said first and said second sprockets are located directly adjacent a corresponding second end of said main and said supplemental crank arms.

10. A bicycle construction as defined in claim 1, there being a first stud threadably engaged to said supplemental crank arm second end and a second stud threadably engaged to said main crank arm second end, each of said first and said second studs extending outwardly from its respective crank arm second end generally normal to the longitudinal axis of said respective crank arm and having a shank portion, said first gear means and one end of said connecting rod being supported on said first stud shank portion, and said second gear means and the other end of said connecting rod being supported on said second stud shank portion, each of said main and said supplemental pedals having a threaded spindle threadably engaged into the end of a corresponding one of said first and said second stud shank portions.

11. A bicycle construction as defined in claim 1 wherein each of said first and said second gear means comprises spaced shoulder portions engaging a respective second end of said main and said supplemental crank arms.

12. A bicycle construction as defined in claim 1 wherein said main crank arm and said supplemental crank arm are of substantially equal length.

13. A bicycle construction as defined in claim 1 wherein the diameter of said first gear means is substantially equal to the diameter of said second gear means.

* * * * *